(12) United States Patent
Rizzi et al.

(10) Patent No.: US 8,518,330 B2
(45) Date of Patent: Aug. 27, 2013

(54) START-UP HEATER FOR AMMONIA REACTORS

(75) Inventors: Enrico Rizzi, Casnate con Bernate (IT); Ermanno Filippi, Castagnola (CH); Mirco Tarozzo, Ligornetto (CH)

(73) Assignee: Ammonia Casale S. A. (CH)

( * ) Notice: Subject to any disclaimer, the term of this patent is extended or adjusted under 35 U.S.C. 154(b) by 498 days.

(21) Appl. No.: 12/990,180

(22) PCT Filed: Apr. 16, 2009

(86) PCT No.: PCT/EP2009/054500
§ 371 (c)(1),
(2), (4) Date: Nov. 9, 2010

(87) PCT Pub. No.: WO2009/132961
PCT Pub. Date: Nov. 5, 2009

(65) Prior Publication Data
US 2011/0123404 A1 May 26, 2011

(30) Foreign Application Priority Data

Apr. 30, 2008 (EP) .................................. 08008252

(51) Int. Cl.
*C01C 1/02* (2006.01)
*H05B 3/10* (2006.01)

(52) U.S. Cl.
USPC ............................................ 422/148; 219/532

(58) Field of Classification Search
USPC .............................................. 422/148; 219/532
See application file for complete search history.

(56) References Cited

U.S. PATENT DOCUMENTS

| | | | |
|---|---|---|---|
| 1,639,272 A * | 8/1927 | Reed .............................. | 423/360 |
| 3,254,967 A * | 6/1966 | Wentworth .................... | 422/148 |
| 4,760,210 A | 7/1988 | Sweeney | |
| 2004/0109794 A1 | 6/2004 | Lomax, Jr. et al. | |

* cited by examiner

*Primary Examiner* — Walter D Griffin
*Assistant Examiner* — Huy-Tram Nguyen
(74) *Attorney, Agent, or Firm* — Akerman Senterfitt

(57) ABSTRACT

An internal start-up heater (10) for an ammonia reactor (1), comprising longitudinal heating members (16) and a supporting structure for said heating members (16), the structure comprising plates (20A-20D) with parallel beams (22A-22D) in contact with said heating members (16), wherein the plates are arranged in plate sets formed by at least a first and a second plate having differently arranged supporting beams.

13 Claims, 5 Drawing Sheets

START-UP HEATER FOR AMMONIA REACTORS

FIELD OF THE INVENTION

The invention relates to the field of reactors for producing ammonia. In detail, the invention relates to an internal start-up heater with elongated electric heating members, for use in ammonia reactors.

PRIOR ART

According to well known art, synthesis of ammonia is carried out in a catalytic reactor or converter where gaseous hydrogen ($H_2$) and nitrogen ($N_2$) are reacted at a high pressure and temperature, usually 130 bar or more and around 500° C. Different kinds of ammonia reactors are known; a common layout for example is a cylindrical vessel containing three radial-flow catalytic beds with intermediate quenching heat exchangers.

During the start-up of the reactor, there is the need to pre-heat the gaseous reactants entering the reactor, up to a temperature of around 450-480° C., in order to start the chemical reaction. To this purpose, the prior art includes the provision of an appropriate start-up heater, which can be realized as an external heater or as an internal electric heater located inside the reactor itself.

The internal start-up heater is a substantially cylindrical equipment, which is coaxially inserted into the reactor through a suitable aperture of a high-pressure cover of the vessel, and essentially consisting of a mounting flange, with the necessary electrical connections, and a bundle of longitudinal heating members.

In a known embodiment, said heating members are made by a non-insulated metal ribbon extending up and down along the electrical heater, in the longitudinal direction, supported by ceramic insulating elements. In another known embodiment, the heating members are formed by armored metal bars, normally bent in a U-like shape. Said metal bars are usually insulated, but in some cases non-insulated bars are also used.

In operation, the gaseous reactants flow longitudinally through the pre-heater and between the heating members, before entering the catalytic reaction zone, e.g. the first catalytic bed.

In a large reactor, the internal heater can be some meters long and requires appropriate spacing and supporting means for the heating members. In the known art, the heating members are kept in position by metal grids or ceramic supports connected by tie-bars. Each of said grids or ceramic supports consists essentially of a ring with crossing beams defining a square grid, retaining each of the heating members with a certain clearance.

These internal heaters have shown drawbacks especially in terms of reliability and service life. Failures of the internal start-up heater have been observed especially in modern units with high production rate and hence high speed of the gaseous flow.

Due to the relatively large clearance between the heating members and the elements of the spacing and supporting grid, the heating members are relatively free to move in any radial direction, i.e. in the plane perpendicular to the longitudinal direction, and hence they are highly sensitive to flow-induced vibrations, to the related mechanical stress and to wear caused by relative movements.

The mechanical stress may result in a permanent deformation or mechanical damage of the heating members. Deformation of the heating members causes damage to the same heating members; contact between heating members may also damage the surfaces of the heating members; contact between non-insulated heating members may also cause short circuits; any damage of a heating member may cause local overheating, due for example to a local reduction of the cross section, with possible melting and destruction of the heating element itself.

In case of relevant deformation of some heating members, it may also become difficult to extract the start-up heater from the vessel for maintenance or substitution. It should also be noted that in most cases the damages of the start-up heater are not immediately detected, for example because the reactor keeps running for a long period of time, while the start-up heater is not in use. Damages are sometimes detected after a certain time, and when the heating elements are irreparably compromised.

Failure of the start-up heater may force to a prolonged stop of the ammonia reactor, with relevant costs in terms of production loss.

It should also be noted that the internal start-up heater is a critical component because the overall diameter must be kept as little as possible, as the heater takes away some of the volume available to the catalytic beds and, hence, to the chemical reaction. For the same reason, the heating members are relatively long and close together, with a compromise between the need of a little diameter and the need of maintaining a sufficient cross-section for the gas flow between the heating members. It is generally not possible to design a larger and/or shorter start-up internal heater to make it more resistant to flow-induced vibrations.

Similar limitations apply to a revamping of an existing ammonia reactor. The maximum size of the internal start-up heater is determined by the available mounting passage in the cover of the vessel: even if the reactor is revamped to a higher production rate, it is generally not possible or not desirable to mount a larger pre-heater, as such modification would involve the expensive substitution of the whole high-pressure cover. On the other side, the revamping may require to increase the speed of gaseous reactants, to increase the productivity, but this would expose the start-up heater to a higher risk of damage by flow-induced vibrations.

Hence, there is a strong need to provide a design of the start-up heater that could overcome the above drawbacks, especially to avoid that failures of an accessory equipment like the start-up heater affects the operation and reliability of the whole reactor and ammonia synthesis plant. Despite this need, however, the current prior art does not provide an effective solution to the above problems.

SUMMARY OF THE INVENTION

The problem underlying the invention is to provide an internal start-up heater for an ammonia reactor more adapted to withstand the stress induced by the gaseous flow and, in particular, less sensitive to flow-induced vibrations.

The problem is solved by an internal start-up heater for an ammonia reactor, said heater comprising a plurality of elongated electric heating members extended in a longitudinal axis of said heater, characterized in that:

the start-up heater comprises a plurality of supporting plates for the heating members, each supporting plate comprising an outer frame and supporting beams in a parallel arrangement, with opposite ends fixed to the outer frame, the supporting beams being disposed in a plane perpendicular to said longitudinal axis and in lanes between the heating members, being in contact with said heating members, and said supporting plates are arranged in at least one set having at least a first and a second plate, the first plate having said supporting beams disposed in a different arrangement compared to supporting beams of the second plate.

The differently-arranged supporting beams of supporting plates forming a plate set provide a synergistic radial support for the heating members. According to an aspect of the invention, the support beams of a selected plate act as stop means for the heating members in a selected radial direction of the start-up heater, so that the sets of supporting plates, thanks to said synergistic radial support, can prevent displacement or vibration of the heating members in any direction perpendicular to the longitudinal axis.

In embodiments of the invention, the heater is equipped with set(s) of supporting plates comprising perpendicular and/or staggered beams, in order to support the heating members against displacement in any radial direction perpendicular to the longitudinal axis of the heater.

More in detail and according to a further aspect of the invention, the pre-heater comprises at least one set of supporting plates, said set comprising at least a first plate with parallel supporting beams disposed in a first direction in said plane perpendicular to the longitudinal axis of the heater, and at least a second plate with parallel supporting beams disposed in a second direction perpendicular to said first direction.

According to another aspect of the invention, the pre-heater comprises at least one set of supporting plates, said set comprising at least a first plate with parallel supporting beams disposed in a first direction, and at least a second plate with parallel supporting beams disposed in the same direction and staggered with respect to beams of said first plate.

In a preferred embodiment, the plates have parallel and equally-spaced supporting beams.

According to a further and preferred aspect of the invention, at least some of the sets of supporting plates comprise plates with differently arranged supporting beams extending in an alternate arrangement in lanes between the rows and/or columns formed by the elongate heating members, so that the set of supporting plates provides at least one supporting beam in each of said lanes. This arrangement provides appropriate contact with the heating members against displacement and vibration in any radial direction perpendicular to the longitudinal axis of the heater.

According to said aspect of the invention, and in a preferred embodiment, the pre-heater comprises at least one four-plate set comprising a sequence of:

a) a first plate with parallel and equally-spaced supporting beams extended in alternate lanes between the heating members;

b) a second plate with supporting beams extended in alternate lanes between the heating members, the supporting beams of the second plate being perpendicular to the beams of said first plate;

c) a third plate with supporting beams parallel and staggered with respect to beams of said first plate, so that beams of said third plate extend in parallel and alternate lanes with respect to beams of the first plate;

d) a fourth plate with supporting beams parallel and staggered with respect to beams of said second plate, so that beams of said fourth plate extend in parallel and alternate lanes with respect to beams of the second plate.

Even more preferably, the heating members of the start-up heater are arranged in a square pitch and the supporting beams are passing through diagonal lanes between the heating members. In an equivalent embodiment however the supporting beams are passing through orthogonal lanes between the heating members.

In a preferred embodiment, the outer frame of the supporting plates is a ring substantially perpendicular to the direction of the elongated heating members. The supporting beams are realized for example with metal tubes welded at the ends to said outer ring frame. As clear to the skilled man, terms like perpendicular and parallel are to be intended in relation to normal tolerances of construction.

Said heating members are realized as electric resistances. In preferred embodiments of the invention, each of said heating members comprises essentially an external shell and an electric heating element disposed inside said shell and electrically insulated from said shell, to prevent the risk of a short circuit.

An object of the invention is also an ammonia converter or ammonia reactor equipped with said start-up heater. A further object of the invention is a method for revamping an ammonia reactor by at least the steps of removing an existing start-up heater, and fitting a start-up heater according to the invention in the original vessel of the ammonia reactor.

The main advantage of the invention is that the elongated heating members of the start-up heater are supported in an efficient and reliable way against stress and vibrations induced by the gas flow of the reactants fed to the ammonia reactor. More in detail, the direct contact with the supporting beams gives support to the heating members against any radial displacement in directions perpendicular to the longitudinal axis of the pre-heater.

As stated above, the plates with differently-arranged supporting beams provide synergistic effect in preventing the flow-induced vibrations. The alternate disposition of the supporting beams of plates forming a plate set is particularly preferred because a given heating member is supported against displacement in a certain direction by direct contact with at least the supporting beams of one of the plates of each plate set, with no or negligible clearance.

As a consequence, the heating members are safely prevented from destructive flow-induced vibrations These and other advantaged will be more evident with the help of the following description of a preferred embodiment, with the help of the enclosed drawings.

DETAILED DESCRIPTION OF A PREFERRED EMBODIMENT

Figure 1:
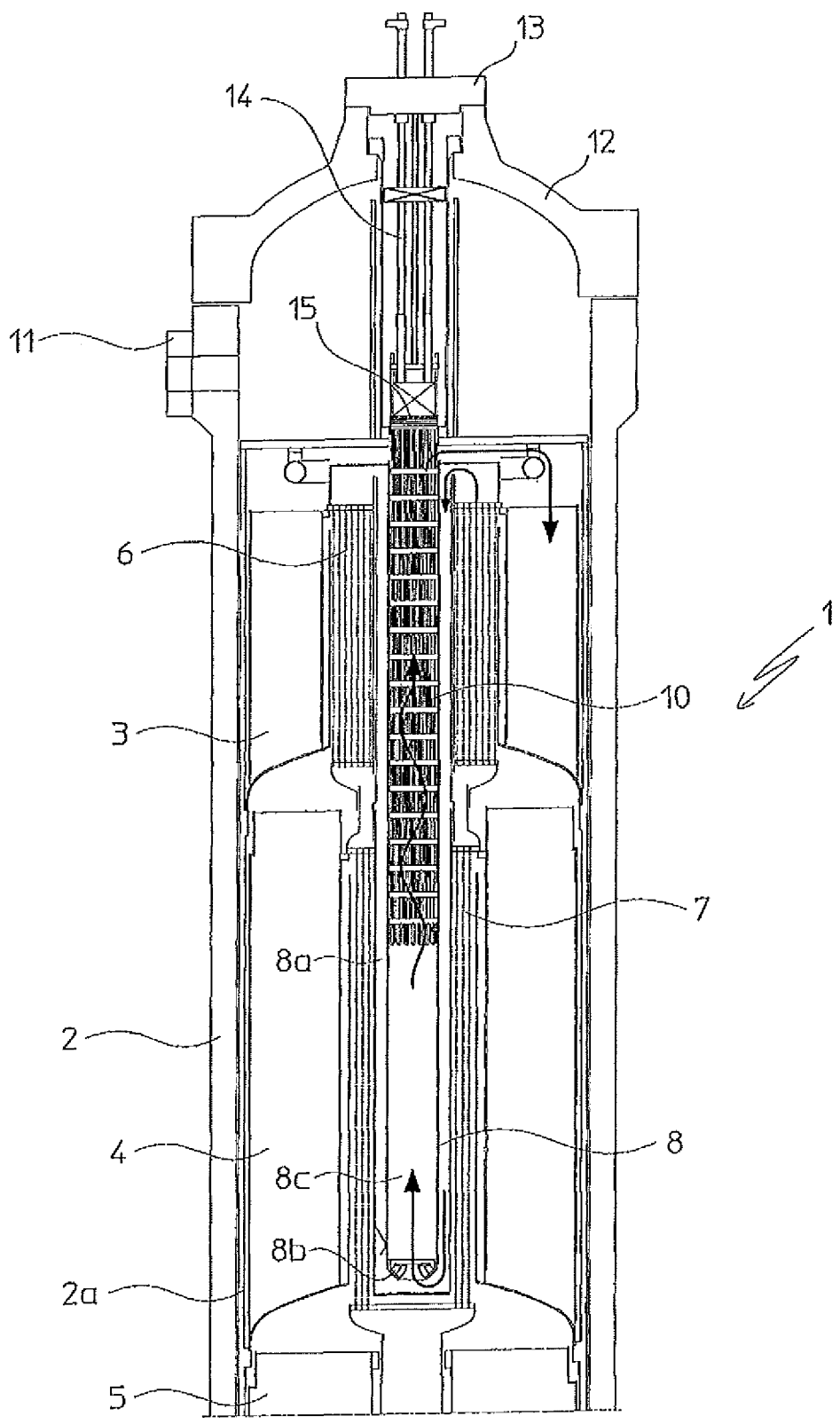
FIG. 1 is a schematical sectional view of an ammonia converter equipped with an internal start-up heater according to an embodiment of the invention.

Referring to FIG. 1, a three-bed ammonia reactor or converter is shown as 1, comprising a vessel 2 containing catalytic beds 3, 4 and 5 with intermediate quenching heat exchangers 6 and 7. The reactor 1 is equipped with an internal electric start-up heater 10; a high-pressure cover 12 of the vessel 2 is also shown in FIG. 1.

The heater 10 is substantially a cylindrical equipment coaxial to the vessel 2, surrounded by a wall 8.

The main components of the start-up heater 10 are: a mounting flange 13 for coupling with the high pressure cover 12, electrical connections 14, a sheet 15 supporting a plurality of elongate heating members, extended in a direction parallel to a longitudinal axis X-X of the heater 10 itself. Said axis X-X is coincident with the axis of the main vessel 2.

In operation, the gaseous reactants enter the vessel 2 at upper inlet 11 and flow in annular space 2a, are pre-heated flowing upwards in exchangers 7 and 6, then flow in an interspace 8a around the wall 8, entering the space 8c via inlet 8b and hence passing axially through the heater 10 and contacting the heating members thereof, reaching the desired temperature of around 450-480° C. At the outlet of the start-up heater 10 the reactants pass to the first catalytic bed 3 where conversion into ammonia starts. The path of the gaseous reactants is shown by the arrows in FIGS. 1 and 2. This kind of ammonia converter is well known to the skilled man and hence is not described in further detail.

In a preferred embodiment, the heating members are electrical resistances in the form of U-shaped armored bars 16 comprising an external sheet and an internal heating element electrically insulated from said external sheet. Preferably the bars are filled with a compressed magnesium oxide powder, insulating the heating element from the sheet itself. The internal element is heated by the passage of an electric current.

In a generic cross section of the heater 10, the electric bars 16 are disposed in a square pitch, i.e. in parallel rows and columns (FIGS. 2-7).

The heater 10 is further provided with supporting plates 20 for the heating members, namely for said electric heating bars 16. Said supporting plates 20 are disposed in planes perpendicular to longitudinal axis X-X and connected by longitudinal tie-bars 23, forming a supporting cage for the bars 16. Plates 20 are made substantially with an outer ring frame and parallel beams having opposite ends fixed to said ring frame.

In accordance with an embodiment of the invention, the start-up heater 10 comprises supporting plates 20 with perpendicular and staggered beams in contact with the heating bars 16.

Figure 2:
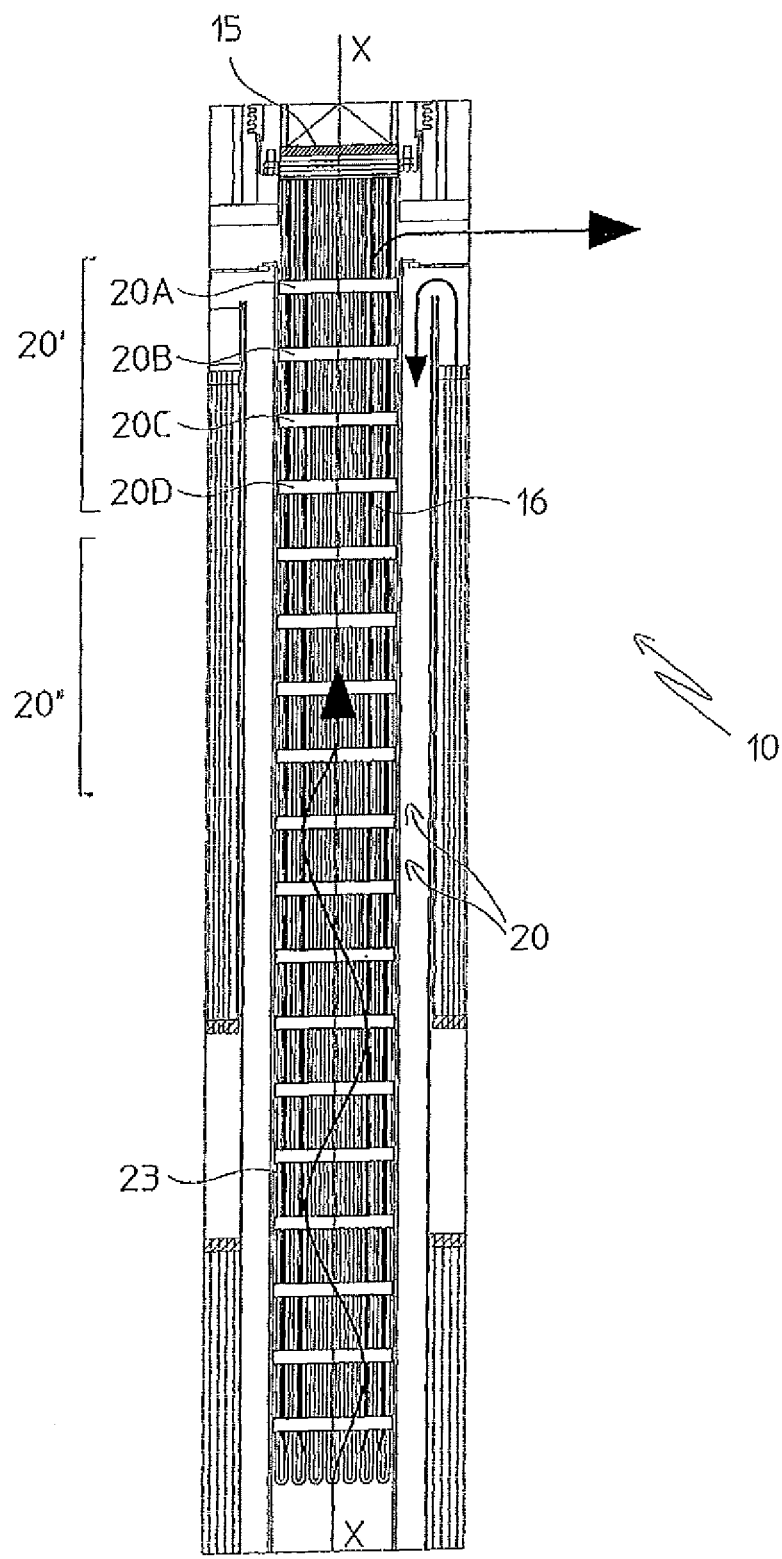
FIG. 2 is a detail of the start-up heater of the ammonia converter of FIG. 1.

In the given example, the plates 20 are arranged in a plurality of four-plate sets. Each plate set comprises a sequence of four, differently structured plates 20A, 20B, 20C and 20D. FIG. 2 show a four-plate set 20' comprising the said plates 20A to 20D and another, adjacent four-plate set 20''. Plates 20A to 20D of the second set 20'' follows the same sequence of the first set 20', and so on.

Figure 3:
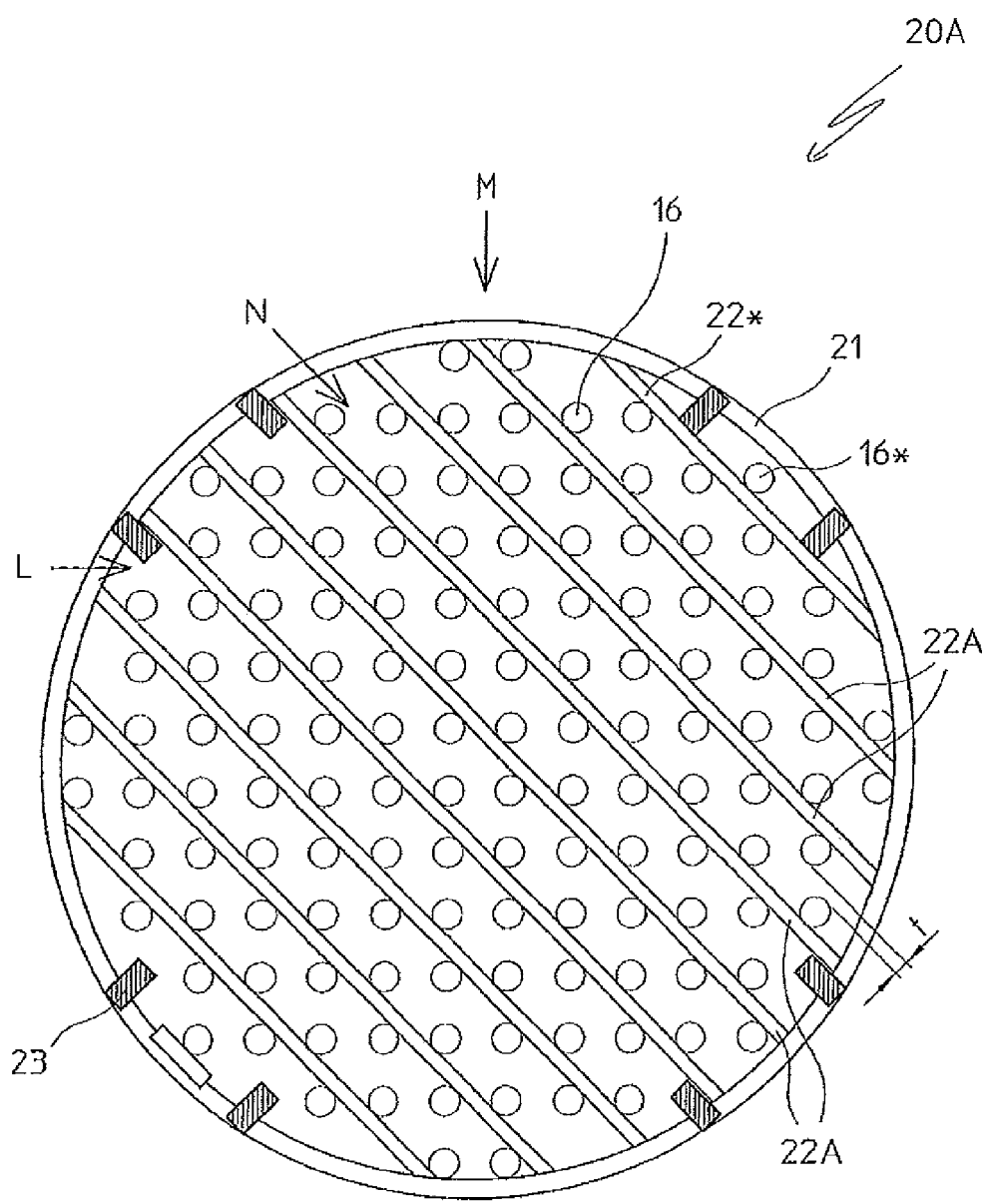
FIGS. 3 to 6 are schemes of the arrangement of supporting beams and plates of the start-up heater of FIG. 2.
Figure 6:
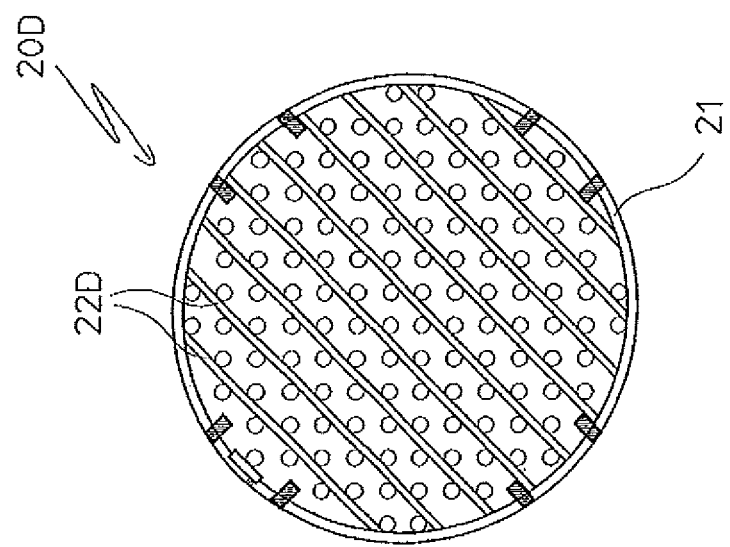
Figure 5:
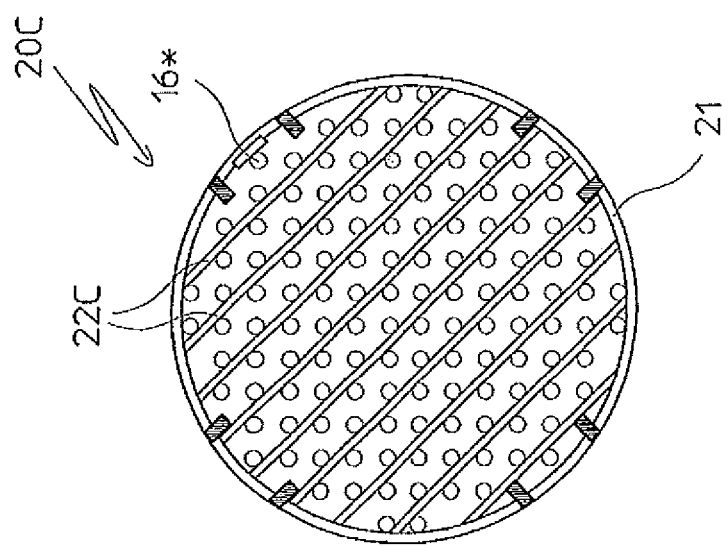

Details and the arrangement of the first plate 20A are shown in the scheme of FIG. 3. The plate 20A is formed essentially by a ring 21 and parallel supporting beams 22A, extending in alternate diagonal lanes N between the bars 16. A dimension (e.g. diameter or equivalent) of beams 22A is substantially equivalent to the clearance "t" between the diagonal rows of bars 16 (FIG. 3), so that each beam 22A is in contact with the two diagonal rows adjacent to the same beam 22A. Preferably the beams 22A are made with tubes welded to the ring 21, the nominal diameter of said tubes being equal to said clearance t.

Figure 4:
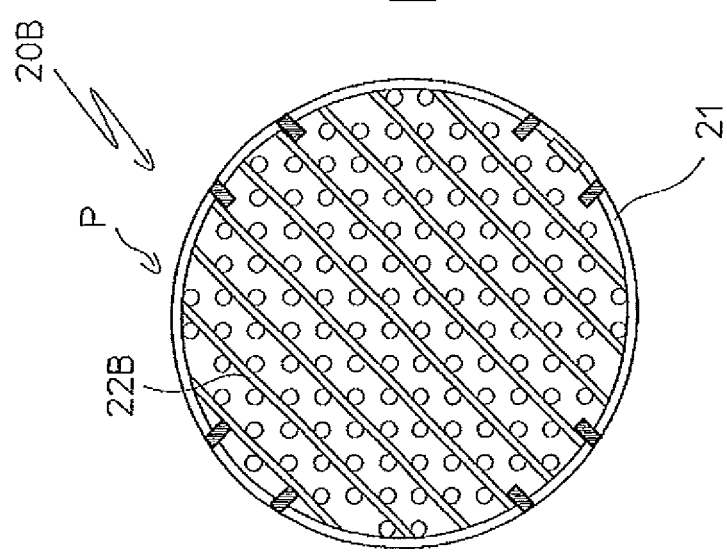

The next plate 20B of the plate set 20' is shown in FIG. 4. Supporting beams 22B of the plate 20B are also diagonal, but arranged in a direction perpendicular to the beams of the plate 20A. Hence, the beams 22B are fitted in lanes P between the bars 16, arranged at 90° with respect to the lanes N receiving the beams 22A of the first plate 20A.

The third plate 20C (FIG. 5) has parallel beams 22C arranged in the same direction of the beams 22A of first plate 20A, and extending in diagonal lanes N. The beams 22C of third plate 20C are however staggered with respect to beams 22A of said first plate 20A, by a distance which is equal to the distance between two consecutive diagonal rows of heating bars 16. This can be appreciated from the drawings, making a comparison between FIG. 3 and FIG. 5, and considering the bar marked 16* which is in contact with the right-upper first beam 22* of the plate 20A, while the first, right upper beam 22C of plate 20C is not in contact with the same bar 16*, lying in the next diagonal lane.

The fourth plate 20D has beams 22D arranged in the same direction of the beams 22B of the second plate 20B, extending in diagonal lanes P and staggered in an equivalent manner.

Depending on the length of the heater 10 and arrangement of the heating members 16, the number of plate sets may vary as well as the number of plates 20 in each set. Some plate sets, e.g. the last set, may be incomplete, comprising for example only three plates or less.

It is to note that, according to the embodiment herein described as an example, the supporting beams of plates 22A and 22C or, respectively, 22B and 22D are complementary, i.e. fitted in complementary sets of diagonal lanes N or P.

Figure 7:
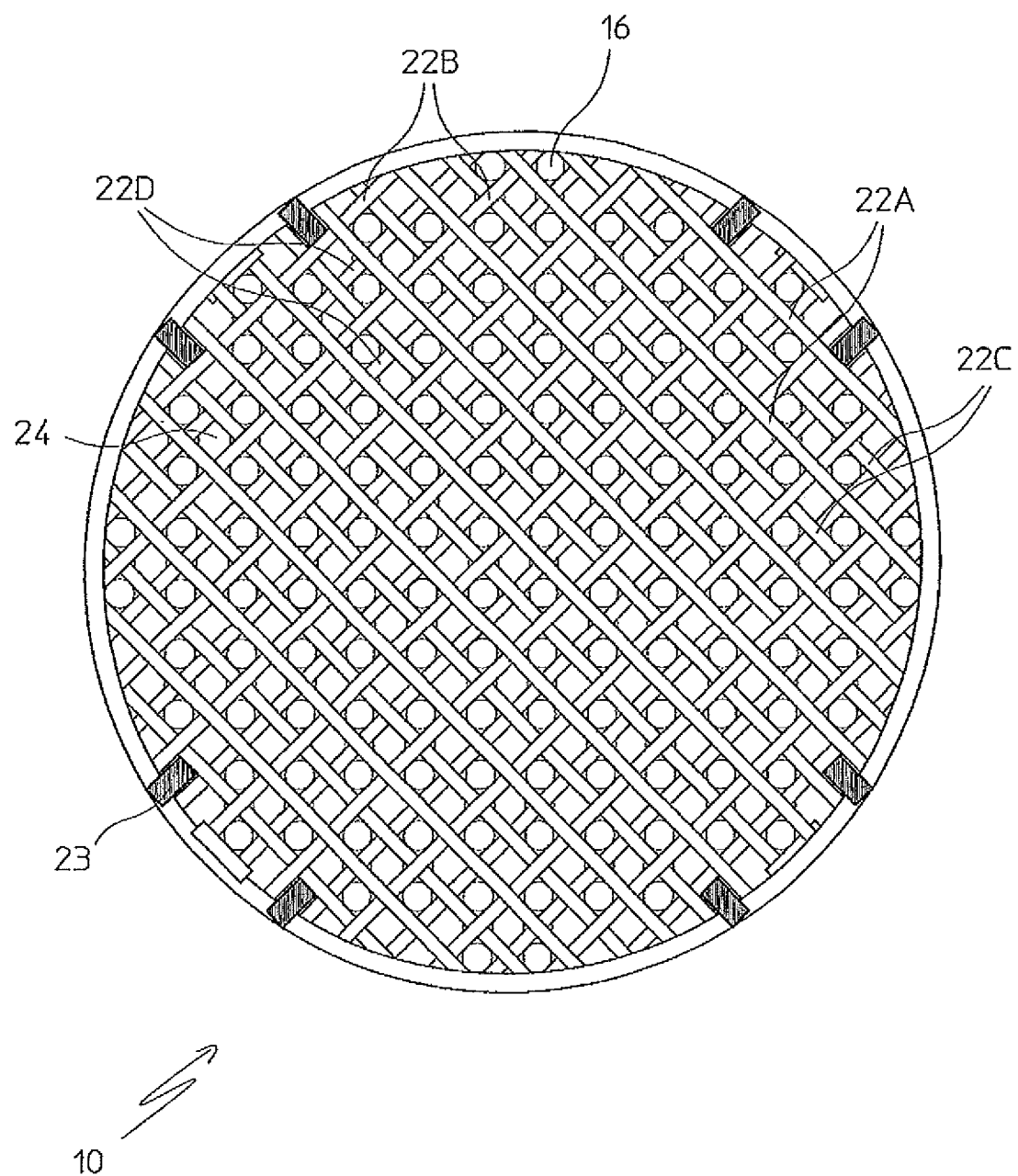
FIG. 7 is a typical cross sectional view of the start-up heater.

FIG. 7 is a typical section of the pre-heater 10, showing that the succession of the different plate sets allows to furnish a radial support on each sides to heating bars 16. A given bar 16 is supported in a synergistic manner by each of beams 22A to 22D, being thus prevented from possible vibrations in any direction perpendicular to X-X.

It should be appreciated that, due to contact with the beams 22A to 22D, the natural vibration modes of the heating bars 16 are shifted to higher frequencies, with the result that the start-up heater 10 is much less sensitive to destructive flow-induced vibrations. At the same time, however, the bars 16 are not subject to any mechanical constraint and for example thermal expansion is freely allowed.

FIG. 7 also shows that the heating bars 16 cover around 50% of the available cross section of the pre-heater, leaving the other 50% cross section for gas flow, through spaces 24.

Alternative geometrical arrangement of the plates and supporting beams can be realized according to the invention.

For example, an equivalent embodiment is possible with the supporting beams fitted in the orthogonal lanes L and M between the heating members 16 (FIG. 3). The first plate 20A, in this equivalent embodiment, is realized with vertical beams in alternate lanes M, and the second plate 20B with horizontal beams in alternate lanes L. The third and fourth plates 20C and 20C in this embodiment have beams parallel and staggered with respect of beams of plates 20A and 20B.

In further embodiments, the beams of plates 20 can be e.g. arranged in two next lanes between the heating bars 16, then skipping two lanes and providing further two beams, etc. . . , or any variation thereof.

The inventive start-up heater 10 can substitute an existing internal heater of an ammonia reactor, in a revamping operation. Referring to FIG. 1, basic steps of the revamping are removing the existing heater from top aperture of cover 12, and providing the new heater with the same overall diameter of the old one, through the original aperture of said cover 12. The provision of the new heater, which is less sensitive to flow-induced vibrations, makes it possible to increase the inlet speed of the reactants and, then, their mass flow rate to the catalytic beds and the production rate of the whole converter 1. It should be noted that these advantages are obtained without taking away any reaction space and without any modification of the vessel 2 or cover 12.

The invention claimed is:

1. An internal start-up heater for an ammonia reactor, said heater comprising:
   a plurality of elongated electric heating members extended in a longitudinal axis of said heater; and
   a plurality of supporting plates for said heating members, each supporting plate comprising an outer frame and supporting beams in a parallel arrangement, with opposite ends fixed to the outer frame, the supporting beams being disposed in a plane perpendicular to said longitudinal axis and in lanes between the heating members, being in contact with said heating members,
   wherein said supporting plates are arranged in at least one set having at least a first and a second plate, the first plate having said supporting beams disposed in a different arrangement compared to supporting beams of the second plate.

2. The heater according to claim 1, wherein said at least one set comprises at least a first plate with parallel supporting beams disposed in a first direction in said plane perpendicular to the longitudinal axis of the heater, and at least another plate with parallel supporting beams disposed in a second direction in said plane and perpendicular to said first direction.

3. The heater according to claim 1, wherein said at least one set comprises at least a first plate with supporting beams according to a first direction in said plane perpendicular to the longitudinal axis of the heater, and at least another plate with supporting beams parallel and staggered with respect to beams of said first plate.

4. The heater according to claim 1, wherein the parallel supporting beams of said plates are equally spaced.

5. The heater according to claim 1, wherein at least some of the plate sets comprise plates with supporting beams extending in alternate lanes between rows and/or columns formed by said elongate heating members, so that each plate set has at least one supporting beam in each of said lanes.

6. The heater according to claim 5, wherein the heater comprises at least one set of four plates, comprising in sequence:
   a first plate with parallel and equally-spaced supporting beams extended in alternate lanes between the heating members;
   a second plate with supporting beams extended in alternate lanes between the heating members, the supporting beams of the second plate being perpendicular to the beams of said first plate;
   a third plate with supporting beams parallel and staggered with respect to the first plate, so that beams of said third plate (MG) extend in parallel and alternate lanes with respect to beams of the first plate;
   a fourth plate with supporting beams parallel and staggered with respect to the second plate, so that beams of said fourth plate extend in parallel and alternate lanes with respect to beams of the second plate.

7. The heater according to claim 6, wherein said heating members are arranged in a square pitch.

8. The heater according to claim 5, wherein said beams of the plates are extended in diagonal lanes between the heating members.

9. The heater according to claim 5, wherein said beams of the plates are extended in orthogonal lanes between the heating members.

10. The heater comprising a plurality of consecutive four-plate sets in accordance claim 6.

11. The heater according to claim 1, wherein each of said heating members is an electrical armored resistance comprising an external shell and an electric heating element inside said shell, said heating element being electrically insulated from said shell.

12. An ammonia converter adapted to react hydrogen and nitrogen for the production of ammonia, said converter comprising a vessel and an internal start-up heater according to claim 1.

13. A method for revamping an ammonia converter comprising a vessel and a start-up heater inside said vessel, the method comprising the steps of:
   extracting the existing start-up heater from said vessel, and fitting into said vessel a start-up heater in accordance with claim 1.

* * * * *